Patented Apr. 21, 1925.

1,534,555

UNITED STATES PATENT OFFICE.

FRED W. WAGNER, OF PITTSBURGH, PENNSYLVANIA, ASSIGNOR TO JONES & LAUGHLIN STEEL CORPORATION, OF PITTSBURGH, PENNSYLVANIA, A CORPORATION OF PENNSYLVANIA.

METHOD OF TREATING WASTE OF BENZOL RECOVERY.

No Drawing. Application filed April 25, 1923. Serial No. 634,605.

*To whom it may concern:*

Be it known that I, FRED W. WAGNER, residing at Pittsburgh, in the county of Allegheny and State of Pennsylvania, a citizen of the United States, have invented or discovered certain new and useful Improvements in Methods of Treating Waste of Benzol Recovery, of which improvements the following is a specification.

In an application for letters patent executed on even date herewith I have described and claimed a method of treating the residue left after recovering benzol, toluol and the xylols from coke-oven gas, in order to derive therefrom an oil such as may be used as a cutting oil. My present invention consists in a method of deriving from the same source a substance adapted to serve as a gear-shield oil, and in the substance itself.

In the treatment of coke-oven gas for the recovery of benzol and its congenors, the gas is first brought into intimate contact with an absorbent menstruum whereby vapors carried by the gases are transferred and taken up by the menstruum. The menstruum is then subjected to distillation and an intermediate product known as light oil is obtained.

This light oil may be washed and then subjected to fractional distillation, or it may be fractionated without washing, and then the fractions may be washed. But in the latter procedure another distillation still remains to be performed to get the benzol, toluol, and xylols free and pure. I prefer the alternative first mentioned, but proceeding by either method I have a residue which consists essentially and chiefly of coumarone, having combined with it some naphthalene and other high boiling-point oils and some sulphonated substances.

This residue has hitherto been considered a waste product and its disposal has been a matter of annoyance. All that I have up to this point described is known to the art. My invention deals with this waste, and beginning with it, I shall describe my invention.

I take this residue, add to it water and heat to 80° C., then allow to cool and stand. Thus an emulsion is formed. To this emulsion when cold I add in ratio of about 30% petroleum oil of specific gravity of .8–.9, preferably .83 to .86. The mixture I allow to stand for 5 days, when a practically solid mass will have settled to the bottom of the receptacle. From this solid mass I decant away the overlying lighter oil. I then heat the residue to 200° C. and in so doing effect a steam distillation, because of the contained water. The residue of this last distillation is then allowed to cool, and after 5 days is ready for use.

The substance is a heavy oil or grease of about the consistency of butter and is excellent as a gear-shield oil.

The consistency may be varied by adding to the mass after the last distillation and while still hot a variable amount of melted sulphur.

I claim as my invention:

1. The method herein described of deriving a by-product oil from the residue which remains after treating the light oil derived from coke-oven gas with sulphuric acid, for the separating therefrom of benzol, toluol, and the xylols, such method consisting in adding water to the residue, heating, and allowing to cool, adding to the cold emulsion petroleum oil and allowing the mass to stand, decanting off the lighter oil, subjecting the remaining substance to distillation, and allowing the residue to cool.

2. The method herein described of treating a residue containing coumarone which consists in forming with it an aqueous emulsion, adding to the emulsion petroleum oil and allowing the whole to stand, then decanting, and subjecting the remaining substance to distillation.

3. The method herein described of treating a residue containing coumarone which consists in forming with it an aqueous emulsion, adding to the emulsion petroleum oil and allowing the whole to stand, then decanting, and subjecting the remaining substance to distillation, and after distillation adding to the still heated substance sulphur.

In testimony whereof I have hereunto set my hand.

FRED W. WAGNER.

Witnesses:
JOHN NUTTALL,
ROBERT C. KEOGH.